United States Patent [19]

Fruengel

[11] 4,451,128
[45] May 29, 1984

[54] METHOD OF AND A DEVICE FOR ADJUSTING A HIGH-SPEED PHOTOGRAPHIC ARRANGEMENT

[76] Inventor: Frank Fruengel, Im Glockenacker 2, 8053 Zurich, Switzerland

[21] Appl. No.: 393,354

[22] Filed: Jun. 29, 1982

[30] Foreign Application Priority Data

Jul. 7, 1981 [CH] Switzerland ............... 4454/81

[51] Int. Cl.$^3$ ............................................. G03B 41/00
[52] U.S. Cl. ............................................. 352/84; 362/3
[58] Field of Search ............... 352/84; 354/354; 362/3

[56] References Cited

U.S. PATENT DOCUMENTS 3,197,675 7/1965 Fruengel et al. ............ 352/84
3,200,410 8/1965 Fruengel ............... 352/84

Primary Examiner—Monroe H. Hayes
Attorney, Agent, or Firm—Michael J. Striker

[57] ABSTRACT

A high-speed photographic device including a spark-discharge flash light unit according to Cranz-Schardin slow-motion camera having an optical projecting and deflecting system for reproducing individual consecutively ignited spark discharges on an image plane is to be adjusted for optimum operation.

The device for adjusting the optical system includes a pulse generator connected to ignition control means for the spark gaps and operating at a repetition rate to ignite simultaneously the spark gaps so as to produce a flicker-free test image of all spark discharges on the image plane.

10 Claims, 3 Drawing Figures

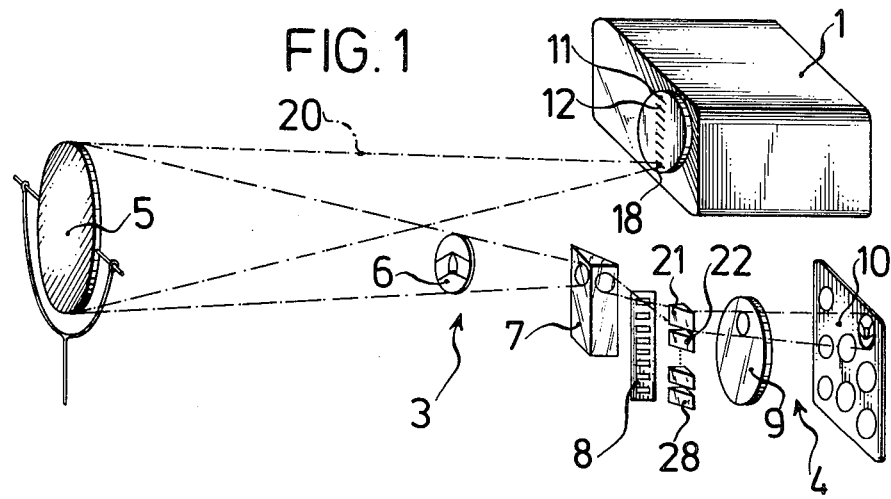
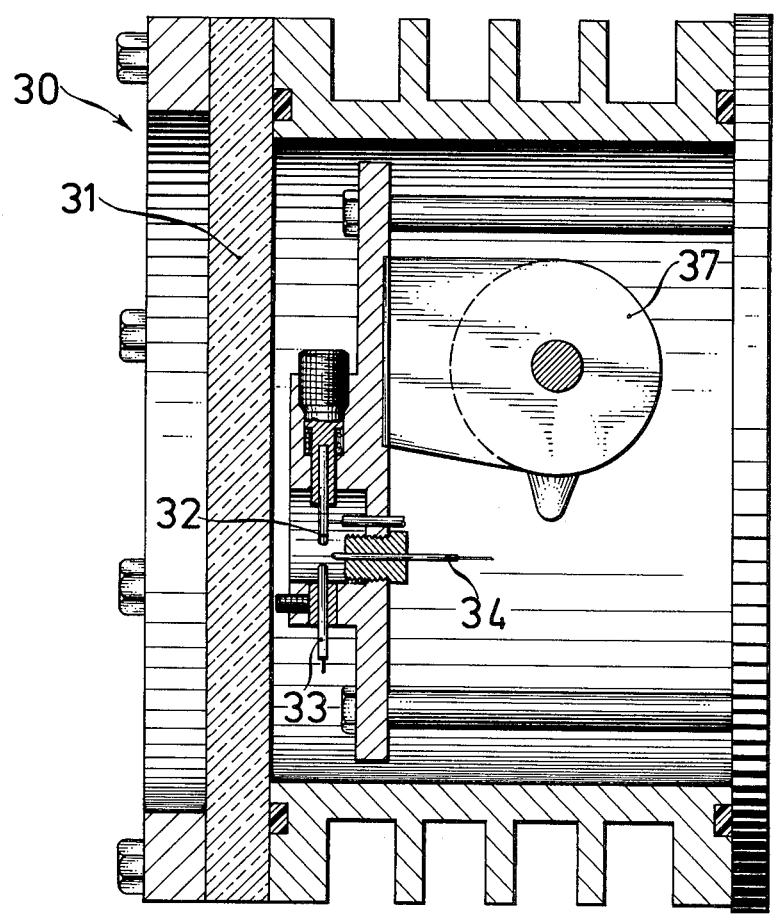

METHOD OF AND A DEVICE FOR ADJUSTING A HIGH-SPEED PHOTOGRAPHIC ARRANGEMENT

BACKGROUND OF THE INVENTION

The present invention relates in general to a high-speed photographic device of the type having a spark-discharge flashlamp unit provided with a plurality of discrete spark gaps, means for sequentially activating respective spark gaps with a time delay of one spark discharge, a projecting optical system and a deflecting optical system cooperating, respectively, with the flashlight unit to take a succession of separate images of the path of movement of an object and reproduce the images side-by-side upon an image plane according to ignition points of respective spark gaps.

In particular the invention relates to a method of and a device for adjusting operational conditions of such high-speed photographic devices.

High-speed photography serves for investigating very fast processes or extremely short paths of movement. The correspondingly short exposure times and high illumination intensities required for taking high-speed photographic pictures can be obtained by means of spark discharges.

One known device of this type is the retarded-action spark system according to Cranz-Schardin. This device includes a spark-discharge flashlamp unit with a plurality of series-arranged spark gaps and a circuit for feeding and controlling the latter. In taking photographic pictures of a momentary process, the spark gaps are ignited in short time intervals, one after the other, to produce a succession of spark flashes. The flashes of individual spark gaps are spatially separated by means of a projecting and deflecting optical system on a photographic plate (or a film) of a receiving camera. As a result, the photographic plate records a succession of images arranged side-by-side of an object, illustrating the movement of the same in fast succession of time points corresponding to the ignition points of individual spark gaps.

A "Cranz-Schardin camera", described in a publication of the firm Impulsphysik GmbH of Hamburg, Germany, entitled "Automatische High Speed Photographie, Schnelle Bewegungsabläufe elektronisch-photographisch analysiert", pages 14 and 15, is designed with a projecting and deflecting optical system including a spherical mirror which focuses the flashlight of individual spark gaps through the object on a corresponding schlieren diaphragm. In the direction of light rays behind respective schlieren diaphgrams, an adjusting prism is arranged for receiving light from each spark gap. By adjusting the prism, it is possible to select the location on the photographic plate of the receiving camera on which the corresponding image is recorded. By adjusting the individual prisms different images are distributed on the photographic plate in such a manner as to prevent overlap, and the resulting arrangement permits the recognition of the time succession of the movement of the object with the best clarity. In a conventional method for adjusting the position of the adjusting prism, incandescent lamps are employed. The incandescent lamps together with spark gaps are arranged on a carrier of a precision slide in such a manner that, for the adjusting operation, the lamps are displaceable to the points at which the spark gaps are situated in the picture-taking position. The adjusting prisms and the remaining parts of the projecting and deflecting optical systems can thus be adjusted by means of the continuous light from the incandescent lamps. In order that the filaments of the incandescent lamps may be accurately placed in the position corresponding to that of the spark gaps during picture taking, an extremely accurate arrangement of the incandescent lamps on the optical slide bench was necessary, and the guiding accuracy of the slide required corresponding precision. The employed optical bench therefore was very expensive, and the installation of the incandescent lamps on the slide was also extremely costly. Moreover, this prior-art method and device did not permit an accurate adjustment because of the differences of the light sources, that is, due to different light intensities of the incandescent lamps and spark gaps. In the course of technical development, light-conductive glass fibers were employed for achieving the desired accuracy of the adjustment. The fibers were illuminated at one end by a lamp and the other end was installed on the optical slide bench instead of the incandescent lamps. A slider with slot-shaped diaphragms was arranged so as to cover the other ends of the glass fibers, to provide strip-shaped light sources corresponding to the configuration of respective sparks. In spite of the fact that this arrangement made it possible to achieve a more accurate adjustment, primarily of the schlieren diaphragm, even this arrangement was expensive and its installation and adjustment extremely time-consuming.

SUMMARY OF THE INVENTION

It is therefore a general object of the present invention to overcome the aforementioned disadvantages.

More particularly, it is an object of the invention to provide an adjusting device for the high-speed photography of the above described kind, by means of which the above described adjustment can be made with simple means and with great precision.

Another object of this invention is to provide an adjusting method resulting in improved quality of pictures by means of the spark-discharge flash unit.

In keeping with these objects, and others which will become apparent hereafter, one feature of the invention resides in a method of adjusting the high-speed photographic devices of the aforedescribed type in which the set of spark gaps is activated at an increased repetition rate, resulting in a reproduction of a flicker-free test image on the image plane, and then adjusting the test image to the desired quality.

The device for adjusting the operation of the high-speed photographic device of the aforedescribed kind includes a pulse generator by means of which the individual spark gaps are ignited at the increased repetition rate, so that the flicker-free image of the object is projected on the image plane.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a perspective view of a device for high-speed photography for obtaining retarded or slow-motion action by sparks according to Cranz-Schardin;

FIG. 2 is a sectional plan view of a spark-discharge flashlamp unit of FIG. 2, illustrating a spark gap.

DESCRIPTION OF THE PREFERRED EMBODIMENT

Figure 3:
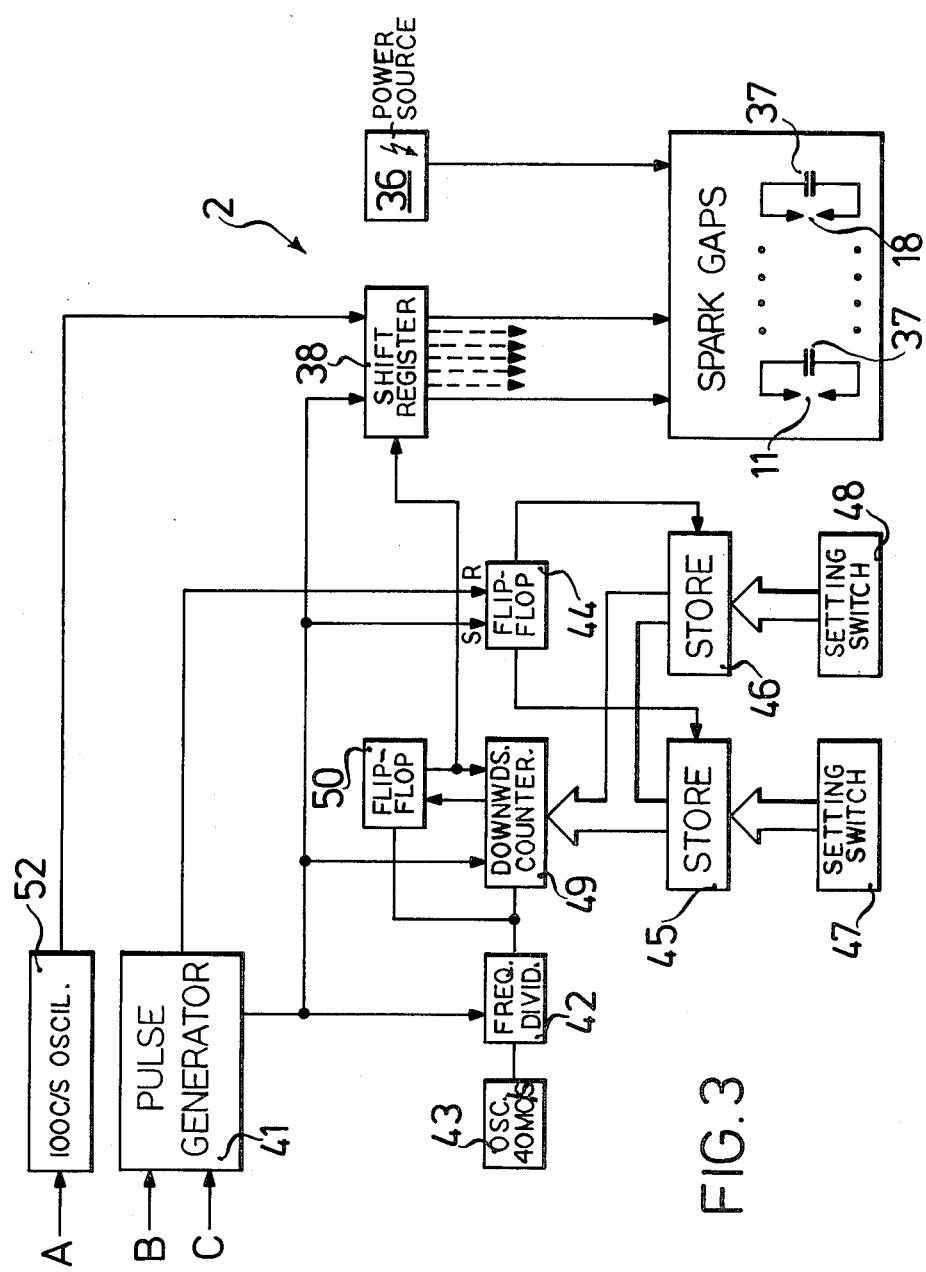
FIG. 3 is a schematic block circuit diagram of a spark-discharge flashlamp unit according to FIG. 1.

The device illustrated in the Figures includes a spark-discharge flashlamp unit 1 with eight spark gaps 11–18 and a power supply and control circuit 2 (FIG. 3) for activating the spark gaps, a projecting and deflecting optical system 3, and a receiving camera 4. The optical system 3 includes a spherical hollow mirror 5, arranged for focusing spark light flashes transmitted by the individual spark gaps 11–18 on the photographed object 6 and through a deflection prism 7 on the individual schlieren diaphragms 8 assigned to respective spark gaps. In FIG. 1, dashed lines 20 illustrate the light rays emitted by the spark-discharge flash of light emitted by the lowermost spark gap 18 which is directed through the uppermost schlieren diaphragm 8. By means of eight adjusting prisms 21–28 the spark-discharge light, upon passing through the assigned schlieren diaphragm 8, is deflected in the receiving camera 4, of which only objective 9 and image plane 10 are illustrated in FIG. 1. During the adjustment process, a frosted or ground glass plate is arranged in the image plane 10, whereas during the picture-taking operation there is provided a photographic plate. The deflection prism 7, the schlieren diaphragm 8 and the adjusting prisms 21–28 are mounted in a non-illustrated attachment head which can be secured to the receiving camera 4.

Referring now to FIG. 2, it will be seen that the spark gaps 11–18, of which only one is visible in FIG. 2, are arranged one above the other at a distance of about 9 mm in a common pressure-resistant housing 30 behind a light-permeable disk 31. The housing is filled up with a gas mixture containing more than 50% by volume of rare gases, for example 20% by volume $N_2$ and 80% by volume of Ar, or 40% by volume $N_2$ and 60% by volume of Kr. The pressure of the gas mixture is increased such that the breakdown field strength for igniting the spark discharge corresponds approximately to that in air under atmospheric pressure. By using the gas mixture consisting predominantly of noble gases and being under overpressure, a high light intensity and a relatively long duration of the spark discharge of the flash unit is achieved, and these features facilitate the below-described adjusting process of the arrangement. Preferably, hydrogen or helium is admixed also in the gas mixture, for example about 20% by volume. As a preferred composition for the gas mixture thus consists of 20% by volume of $H_2$ or He and 80% by volume of Ar or 20% by volume $N_2$, 20% $H_2$ or He, and 60% by volume Kr. It has proved that the gas mixture due to the admixing or hydrogen or helium obtains a high thermal conductivity. The increased thermal conductivity prevents excessive overheating of the spark gaps during the below-described adjusting process according to this invention.

The spark gaps are the so-called three-electrode spark gaps, that is, each spark gaps has two master electrodes 32 and 33 between which the spark discharge takes place and an ignition electrode 34 for igniting the discharge. The diameter of the two main or master electrodes 32 and 33 is about 2 mm and the clearance, that is, the length of the spark gap, is also 2 mm. This relatively thick construction of the main electrodes 32 and 33 is also essential for the successful adjusting process according to this invention, in which each spark gap is ignited at a repetition frequency of 100 cycles per second. At this frequency, the tips of thinner electrodes would glow because of the insufficient heat conduction.

The power supply and control circuit 2 illustrated schematically in FIG. 3 includes a high-voltage power source 36 which supplies adjustable feed voltage of 2.5 to 4.5 kilovolts to ceramic capacitors 37 which are connected parallel to respective spark gaps 11–18. The ignition currents for the ignition electrodes 34 are initiated by non-illustrated thyristors. The control electrodes of the total of eight thyristors are connected to the outputs of assigned transistor AND-gates of a shift register 38. The two inputs of the AND-gates are connected to one storing cell of the shift register and to a clock pulse input of the latter.

The shift register 38 is connected to a pulse generator 41 which is switched off by a releasing pulse or by actuating a switch on its input B to initiate a photographic picture of an object moving at high speed. The impulse generator 41 starts a frequency divider 42 which divides the basic frequency of 40 megahertz of a quartz-controlled oscillator 43 in a ratio of 4:1. The pulse generator 41 also sets a flip-flop 44 which interrogates two stores 45 and 46. The stores 45 and 46 store respectively a value of a starting delay time and a clock pulse delay time selected by setting switches 47 and 48. Furthermore, as mentioned before, the pulse generator 41 controls the first flip-flop storing cell of the shift register 38. The values of the starting delay time and of the clock pulse delay time are applied to a programmable downwards counter 49. In particular, the read-in of the starting delay time is initiated by the pulse generator 41 and the read-in of the clock pulse delay time is released by a flip-flop 50 at the moment when the counter 49, which counts downwardly in synchronism with the frequency of 10 megahertz delivered by the frequency divider 42, reaches zero value. Simultaneously with reading-in the clock pulse delay time in the downward counter 49, a clock pulse is delivered from flip-flop 50 to the clock pulse input of the shift register 38. By means of the first clock pulse which is generated after runoff of the starting delay time, the transistor AND-gate of register 38, which is connected to the first storing stage of the latter, becomes conductive and the corresponding thyristor delivers the ignition current for the ignition electrode 34 of the first spark gap 11. Simultaneously, the first storage cell is disabled and the second storing cell is enabled. After the expiration of the clock pulse delay time, the second spark gap 12 is ignited in the above-described manner. In the same manner, the remaining spark gaps become activated. The individual spark gaps 11–18 thus produce a succession of spark discharges, whereby the time interval between the discharges corresponds to the clock pulse delay time preselected by the switch 48. After the ignition of the last spark gap 18, all storing cells in the register 38 are disabled, so that no ignition of the spark gaps can occur. By actuating a switch at the input C of the impulse generator 41, the flip-flop stage 44 is reset and stores 45, 46 as well as the counter 49 are brought into their starting states.

For adjusting the aforedescribed device, the circuit 2 includes a 100-cycles-per-second oscillator 52 which during the period required for adjustment is activated by a non-illustrated switch at its input A and starts activation of all spark gaps at the repetition rate of 100

Hz. The 100-Hz oscillator 52 is thus connected to both inputs of transistor AND-gates of the shift register 38, and consequently during the adjusting process all spark gaps are simultaneously ignited at a repetition rate of 100 cycles. In a modification, it is also possible to connect oscillator 52 through the shift register 38 and to the switching units for the clock pulse generation in similar manner as the clock pulse generator 41, so that spark gaps 11-18 be momentarily ignited one after the other at the repetition rate of 100 Hz.

The setting and adjustment of the device for the high-speed photography is made as follows:

The spark-discharge flash unit 1, mirror 5 and the receiving camera 4 with the attachment head 3 are installed such that the eight sparks generated in spark gaps 11-18 are sharply reproduced at a scale of 1:1 in the schlieren diaphragms 8. For this purpose, the mirror 5 must be arranged at a distance corresponding to double the focal length from the spark gaps and schlieren diaphragm 8. As soon as the three components are arranged approximately in this spatial relationship, the oscillator 52 is switched on for completing an accurate adjustment. The mirror 5 is first rotated so that the spark discharges generated in the spark gaps at the repetition rate of 100 Hz are reflected into themselves or are formed with images which are staggered laterally about several millimeters. The scale of 1:1 of the reproduced images is accurately obtained when the spacing between the spark gaps and the spacing between the images of the sparks correspond accurately to each other. Thereupon mirror 5 is turned and the attachment head on camera 4 is adjusted such that the eight sparks are sharply reproduced in the planes of schlieren diaphragm 8. In doing so, the schlieren diaphragms 8 are first adjusted so that the spark-discharge flash light can pass through the diaphragms without obstruction. Thereupon are adjusted the prisms 21-28 by means of the ground glass disk 10 inserted during the adjusting process into the image plane 10 of camera 4. Each of the spark gaps 11-18 when ignited at the repetition rate of oscillator 52 produces on the ground glass disk 10 a light spot which is continuously visible by the observer. The adjusting prisms 21-28 now can be set so that the light spots of individual spark gaps 11-18 do not overlap and permit a clear recognition of the time succession to which the spark gaps during the photographic picture taking are consecutively ignited. It is of advantage for the adjusting operation when the bellows of the camera are removed, and in order to make the light spots clearly visible a white paper is placed before the ground glass plate. Finally, for taking schlieren pictures, the schlieren diaphragms 8 are adjusted so that the direct image of the sparks is substantially covered. The adjustment of the device for taking photographic pictures is now complete, and oscillator 52 is switched off. The taking of photographic pictures is released by switching on the clock pulse generator 41.

The repetition rate of oscillator 52 can be also smaller than 100 cycles, but it should always be selected such that a continuously visible, substantially flicker-free image of the spark discharges be reproduced on the image plane. This can be achieved for example even at a frequency of 16 cycles, but the brightness of individual images is not very high. At a frequency of 50 cycles it is possible to obtain very bright individual images yielding a flicker-free impression which is agreeable for observation.

It will be understood that each of the elements described above, or two or more together, may also find a useful application in other types of constructions differing from the types described above.

While the invention has been illustrated and described as embodied in a specific example of a device for a high-speed photography, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of adjusting a high-speed photographic device of the type having a spark-discharge flash light unit provided with a plurality of discrete spark gaps, means for sequentially activating respective spark gaps with a time delay of one spark discharge, a projecting optical system and a deflecting optical system cooperating with the flash light unit to take a succession of separate images of the movement of an object and reproduce the images side-by-side on an image plane, comprising the steps of activating the spark gaps at an increased repetition rate to reproduce on the image plane a flicker-free test image of all spark discharges, and adjusting the projecting and deflecting optical systems to produce a test image of a desired quality.

2. A method as defined in claim 1, wherein the repetition rate is at least 10 cycles per second.

3. A method as defined in claim 1, wherein said spark gaps are ignited simultaneously at said repetition rate.

4. A method as defined in claim 1, wherein said spark gaps are ignited sequentially at short time intervals relative to the repetition rate.

5. A device for adjusting a high-speed photographic device of the type having a spark-discharge flash light unit provided with a plurality of discrete spark gaps, control means for sequentially activating respective spark gaps, a projecting optical system and a deflecting optical system for the spark discharges, a receiving camera cooperating with the projecting and deflecting systems to reproduce the spark discharges on an image plane, a pulse generator connected to said control means for the flash light unit to activate all spark gaps in the latter at a repetition rate at which a substantially flicker-free test image is reproduced on the image plane.

6. A device as defined in claim 5, wherein the spark gaps include electrodes of increased thermal capacity so that no overheating of the electrodes occurs during the adjusting process.

7. A device as defined in claim 6, wherein the electrodes in each spark gap have a diameter of at least 2 mm.

8. A device as defined in claim 6, wherein said flash light unit includes a gas-tight, pressure-resistant housing provided in the range of the spark gaps with a light-permeable window, a gas mixture containing at least 50% by volume of noble gases being enclosed in the housing at an increased pressure sufficient for establishing a breakdown field strength between the respective electrodes corresponding to that in air at normal atmospheric pressure.

9. A device as defined in claim 8, wherein the gas mixture contains hydrogen or helium.

10. A device as defined in claim 9, wherein the hydrogen or helium component of the gas mixture amounts to about 20% by volume.

* * * * *